US012757912B2

(12) United States Patent
Henson et al.

(10) Patent No.: US 12,757,912 B2
(45) Date of Patent: Oct. 13, 2026

(54) SPRAY-DRIED COFFEE PRODUCT AND PRODUCTION METHOD

(71) Applicant: Koninklijke Douwe Egberts B.V., Utrecht (NL)

(72) Inventors: Sian Henson, Banbury (GB); Joe Welsh, Banbury (GB); Borja Roman Corrochano, Banbury (GB); Eva Espino, Banbury (GB); Javier Silanes-Kenny, Utrecht (NL); Charles Edge, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 641 days.

(21) Appl. No.: 18/012,640

(22) PCT Filed: Jun. 24, 2021

(86) PCT No.: PCT/EP2021/067389
§ 371 (c)(1),
(2) Date: Dec. 22, 2022

(87) PCT Pub. No.: WO2021/260135
PCT Pub. Date: Dec. 30, 2021

(65) Prior Publication Data

US 2023/0248014 A1 Aug. 10, 2023

(30) Foreign Application Priority Data

Jun. 25, 2020 (GB) ..................................... 2009706

(51) Int. Cl.
*A23F 5/26* (2006.01)
*A23F 5/34* (2006.01)
(Continued)

(52) U.S. Cl.
CPC .................. *A23F 5/26* (2013.01); *A23F 5/34* (2013.01); *A23F 5/36* (2013.01); *A23F 5/46* (2013.01)

(58) Field of Classification Search
CPC ...... A23F 5/26; A23F 5/34; A23F 5/36; A23F 5/46; A23F 5/00; A23F 5/28; A23F 5/48;
(Continued)

(56) References Cited

U.S. PATENT DOCUMENTS 3,361,571 A * 1/1968 Nutting .................. A23F 5/226 426/387
3,361,572 A * 1/1968 Nutting .................. A23F 5/265 426/434

(Continued)

FOREIGN PATENT DOCUMENTS

EP 0826308 3/1998
EP 0916267 5/1999

(Continued)

OTHER PUBLICATIONS

Combined Search and Examination Report, dated Oct. 27, 2020, United Kingdom Patent Application No. GB2009706.9, 2pgs.

(Continued)

*Primary Examiner* — Viren A Thakur
*Assistant Examiner* — Luis Eugenio Diou Berdecia
(74) *Attorney, Agent, or Firm* — Fitch, Even, Tabin & Flannery LLP

(57) ABSTRACT

The present invention relates to a method of producing a coffee powder, the method comprising: a) providing an aqueous coffee extract comprising from 30 to 55 wt % soluble coffee solids and from 1 to 10 wt % oil, wherein the aqueous coffee extract consists of water and coffee-derived components; b) subjecting the aqueous coffee extract to a two stage homogenisation process, wherein the first stage is
(Continued)

conducted at 200 to 1000 Bar and the second stage is conducted at 10 to 100 Bar, to provide a homogenised coffee extract; c) spray-drying the homogenised coffee extract.

11 Claims, 1 Drawing Sheet

(51) Int. Cl.
*A23F 5/36* (2006.01)
*A23F 5/46* (2006.01)

(58) Field of Classification Search
CPC .......... A23F 5/262; A23F 5/505; A23F 5/265; A23F 5/243; A23F 5/08; A23F 5/486; A23F 5/24; A23F 5/32; A23V 2002/00; A23V 2250/5028; A23V 2250/2108
USPC .................... 426/595, 594, 658; 99/308, 511
See application file for complete search history.

(56) References Cited

U.S. PATENT DOCUMENTS

| | | | | | |
|---|---|---|---|---|---|
| 3,529,968 | A * | 9/1970 | Hair | A23F 5/26 | 426/434 |
| 3,652,292 | A | 3/1972 | Bach | | |
| 3,682,649 | A | 8/1972 | George | | |
| 3,769,032 | A | 10/1973 | Lubsen | | |
| 5,882,717 | A | 3/1999 | Panesar | | |
| 5,997,929 | A | 12/1999 | Heeb | | |
| 6,165,536 | A * | 12/2000 | Heeb | A23F 3/18 | 426/594 |
| 2005/0233053 | A1* | 10/2005 | Shen | A23L 2/68 | 426/599 |
| 2006/0035000 | A1* | 2/2006 | Bunke | A23F 5/46 | 426/594 |
| 2007/0231443 | A1* | 10/2007 | Goto | A23F 5/28 | 426/594 |
| 2010/0239738 | A1* | 9/2010 | Baechler | A23C 11/04 | 426/585 |
| 2013/0202748 | A1* | 8/2013 | Fountain | A47J 31/44 | 426/115 |
| 2014/0106055 | A1 | 4/2014 | Gamay | | |
| 2015/0296829 | A1* | 10/2015 | Penner | A23F 5/46 | 426/507 |
| 2016/0302437 | A1* | 10/2016 | De Kok | A23F 5/46 | |
| 2017/0202237 | A1* | 7/2017 | Sørensen | A23F 5/26 | |
| 2018/0206514 | A1* | 7/2018 | Birch | A23F 5/483 | |

FOREIGN PATENT DOCUMENTS

| | | | |
|---|---|---|---|
| EP | 1069830 | | 1/2001 |
| EP | 1795074 | | 6/2007 |
| EP | 3386313 | | 10/2018 |
| GB | 1399650 | | 7/1975 |
| GB | 2520342 | | 5/2015 |
| GB | 2580323 | | 7/2020 |
| JP | 2008508900 | | 3/2008 |
| JP | 2013055916 | A | 3/2013 |
| JP | 2016504923 | | 2/2016 |
| KR | 20180021268 | | 3/2018 |
| RU | 2491828 | C2 | 9/2013 |
| RU | 2636347 | C2 | 11/2017 |
| WO | 2009040249 | | 4/2009 |
| WO | 2014083422 | | 6/2014 |
| WO | 2014123412 | | 8/2014 |
| WO | 2015197340 | | 12/2015 |
| WO | 2016209075 | | 12/2016 |
| WO | 2017097303 | | 6/2017 |
| WO | 2020136146 | | 7/2020 |

OTHER PUBLICATIONS

Delgado, P.A., et al.; "Sediments in coffee extracts: Composition and control by enzymatic hydrolysis"; Food Chemistry, Elsevier, NL, vol. 110, No. 1, Jan. 31, 2008, pp. 168-176.
Further Search Report dated Jan. 6, 2021, United Kingdom Patent Application No. GB2009706.9, 1 pg.
International Search Report and Written Opinion of the International Searching Authority, date of mailing Oct. 14, 2021, International Application No. PCT/EP2021/067389, 11 pgs.
Search Report dated Oct. 23, 2020, United Kingdom Patent Application No. GB2009706.9, 1pg.
Office Action dated Feb. 2, 2024, Japanese Patent Application No. 2022-579723, with English translation (6 pgs.).
First Office Action dated Aug. 29, 2024, Chinese Patent Application No. 202180045626.2, with English translation (14 pgs.).
Office Action dated May 15, 2024, Russian Patent Application No. 2023101351, with English translation (8 pgs.).
Notice of Preliminary Rejection, dated Apr. 10, 2025, Korean Patent Application No. 10-2023-7001204, with English translation (16 pgs.).
Office Action dated Jul. 24, 2025, Russian Patent Application No. 2023101351, with English translation (6 pgs.).

* cited by examiner

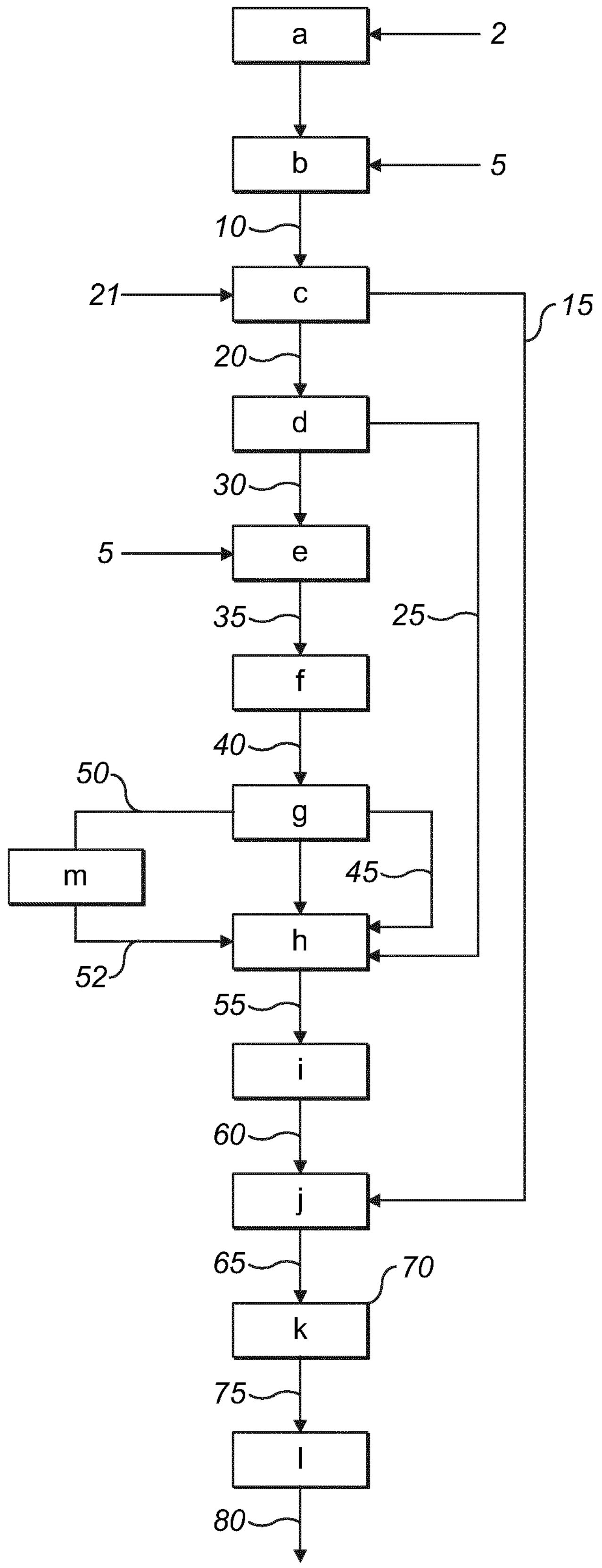
a
2
b
5
10
c
21
15
20
d
30
e
5
35
25
f
40
50
g
m
45
h
52
55
i
60
j
65
70
k
75
l
80

SPRAY-DRIED COFFEE PRODUCT AND PRODUCTION METHOD

CROSS REFERENCE TO RELATED APPLICATIONS

This application is a U.S. national phase application of International Application No. PCT/EP2021/067389, filed Jun. 24, 2021, which claims benefit from United Kingdom Application 2009706.9, filed Jun. 25, 2020, which are each hereby incorporated herein by reference in their entirety.

FIELD OF THE INVENTION

The present invention relates to a process for providing an improved spray-dried coffee product and to the spray-dried product. In particular, it relates to a spray-dried coffee having an improved sensorial profile obtained by spray-drying an oil-rich homogenised coffee extract.

BACKGROUND OF THE INVENTION

The extraction of roast and ground coffee with water to obtain a high coffee-solids coffee extract is well known. Moreover, it is well known to dry such an extract with spray- or freeze-drying to obtain a soluble beverage powder. This beverage powder can then be reconstituted at the consumer's convenience with hot water to obtain a coffee beverage. It is desirable that such a home-made coffee beverage has a taste akin to coffee shop beverages.

The industrial production of soluble coffee products is associated with higher temperatures and pressures than coffee shop brewing systems. This allows a higher yield to be obtained from the beans and hence a higher profitability, but has a side-effect that the coffee can adopt undesirable processing flavour notes. A large number of different techniques are employed to avoid this, including methods of aroma capture to ensure that flavour molecules are retained from initial lower temperature extraction steps.

An example of a conventional coffee extraction process involves the following steps. Green coffee beans are roasted to a desired roasting extent and ground to a particle size of 2-3 mm. This is subject to a column extraction process having a first step at about 150° C. and a second at a higher temperature of about 185° C. Coffee extracts washed from the beans in each extraction step are combined, concentrated and dried. The process is semi-continuous with the use of multiple extraction columns.

EP0826308 discloses a process for the counter-current extraction of soluble coffee solids. Soluble coffee solids are extracted from roast and ground coffee in a first extraction stage using a primary extraction liquid at a temperature of 80° C. to 160° C. Then soluble coffee solids are extracted from the partially extracted grounds in a second extraction stage using a secondary extraction liquid at a temperature of 160° C. to 190° C., the coffee grounds having at least 25% by weight of soluble coffee solids extracted from them. The coffee grounds obtained from the second extraction stage are drained and thermally hydrolysed in a hydrolysis stage at a temperature of 160° C. to 220° C. for 1 to 15 minutes. Soluble coffee solids are extracted from the hydrolysed coffee grounds in a third extraction stage using a tertiary extraction liquid at a temperature of 170° C. to 195° C. to provide extracted coffee grounds and a hydrolysed coffee extract. A soluble coffee product is obtained containing at least 30% saccharides, comprising less than 1% furfural derivatives, less than 4% monosaccharides, less than 10% oligosaccharides and at least 19% polysaccharides, the saccharides having a weighted average molecular weight of greater than 2000 units with a polydispersity above 3.

EP0916267 discloses a process for the continuous extraction of water soluble solids from solid particles containing them, such as roast and ground coffee, for providing an extract product in one or more extraction stages. In each extraction stage, a slurry containing particles to be extracted and extract is introduced into an extraction reactor e.g. immediately above a solid-liquid separator to form an upwardly moving packed bed. Particles are scraped from the packed bed for defining an upper surface of the packed bed. An extraction liquid is introduced into the extraction reactor above the upper surface of the packed bed. A portion of the extraction liquid percolating through the packed bed for extracting water soluble substances from the particles in the packed bed is obtained to form an extract. The remaining portion of the extraction liquid entrains the particles scraped from the packed bed for providing a spent particles slurry. The spent particles slurry is removed from the extraction reactor. Extract is removed from below the packed bed and at least a portion of the extract forms the extract product. The extraction stages may be separated by one or more solubilisation stages.

EP1069830 discloses a process for the recovery of aroma components from coffee. A slurry of coffee grounds in an aqueous liquid is subjected to stripping for stripping aroma components from the slurry. The stripping is carried out using gas in a substantially counter-current manner to provide an aromatised gas containing aroma components. The aroma components are then collected from the aromatised gas. The aroma components may be added to concentrated coffee extract prior to drying of the extract. The coffee powder produced has much increased and improved aroma and flavour and contains higher levels of furans and diketones.

U.S. Pat. No. 3,682,649 discloses a cold water, pressurised extraction of roasted coffee, in the form of whole beans or ground, to obtain a quality coffee extract and partially extracted coffee which can be further processed. The coffee extract can be dried to obtain a premium soluble coffee. The partially extracted coffee can be further extracted by standard percolation techniques or can be dried and used as regular roasted and ground coffee.

U.S. Pat. No. 3,652,292 discloses the manufacture of an instant coffee powder which comprises soluble coffee solids prepared by extraction as an aqueous medium, into which wet ground colloidal particles of roast or extracted roast coffee are added. The colloidal particles represent about 3 percent to 40 percent by weight of the total weight of the coffee product. The colloidal particles are stabilized against flocculation by regulation of the pH so as not to exceed a pH of 5.2 and said particles are encased in the dried soluble coffee solids to form an instant coffee product having a fresh-brewed coffee aroma flavour and turbidity.

EP1795074 relates to a method of providing a concentrated coffee extract which is rich in aroma component released when the roasted coffee beans are ground and has an amount of coffee oil controllable in accordance with the use and purpose, and a process for industrially producing the same. According to the present invention, the above object is achieved by separating an aroma component-containing distillate, a coffee oil-containing liquid, and a coffee extract from a slurry obtained by wet-grinding roasted coffee beans, and after the coffee extract is concentrated, adding back the aroma component-containing distillate and the coffee oil-containing liquid.

US2015/296829 describes a method for the surface-treatment of a soluble coffee to improve its flavour and aroma. The method involves the sequential addition of 0.5 to 4 wt % coffee oil and then 1 to 3 wt % water onto the surface of an existing soluble coffee powder.

EP0916267 discloses a method for extracting coffee from roast and ground coffee beans. In particular, the product which is obtained from the extraction reactor 10 through the lower outlet 30 is the liquid coffee extract 32. This is split into a recycled coffee extract 42 for slurrying fresh coffee grounds and a product coffee extract 20 (paragraph [0026]). The liquid leaving through the lower outlet 30 is the liquid that has already passed through screen 14 which holds back the coffee solids.

U.S. Pat. No. 3,361,571 relates to a method of obtaining a decaffeinated coffee product.

EP1795074 relates to an extraction process for providing an aroma-containing clarified and concentrated coffee extract. Key to the process is a low temperature wet milled extraction. As a consequence of the low temperature, the extract will contain low levels of the mannans which cause sedimentation and contribute the insoluble coffee fraction. Moreover, the extract is subjected to three clarification steps (rough filtering, centrifuging and fine-filtering).

Since the production of liquid (i.e. aqueous) coffee extracts and dried soluble coffee products is associated with a disparity in flavour, compared to freshly made coffee beverages made fresh in a coffee-shop environment, there is a constant aim to improve the methods of production to achieve improved products. One common approach to improving the flavour of dried soluble coffee products is the addition of finely ground roasted coffee particles into a coffee extract before drying. The inclusion of such particles is typically controlled to avoid undue sediment in the beverage, but generally does have a beneficial effect on the product flavour. The presence of small particles can also contribute to the observed mouthfeel.

GB1399650 discloses improvements in the agglomeration of water soluble instant foodstuff powders.

US2006/0035000 discloses a soluble coffee product having an improved flavour and aroma, the coffee product comprising a soluble particulate coffee and a non-aromatized coffee oil. The process relies upon the solvent extraction of coffee oil or the expression of coffee oil from beans under pressure.

US2015296829 relates to a method of adding coffee oil to the surface of an already-formed coffee powder to improve the product aroma.

US2014/106055 relates to a technique of producing an ultra-concentrated liquid coffee that is shelf-stable at ambient temperature without the need for refrigeration or freezing.

WO2020136146 discloses an instant coffee composition for forming a coffee beverage, wherein the composition comprises at least 6 wt % of an insoluble coffee sediment fraction, the insoluble coffee sediment fraction comprising, when analysed after acid hydrolysis, 1 wt % or less arabinose.

Accordingly, it is desirable to provide an improved method for making coffee products, improved coffee products and/or to tackle at least some of the problems associated with the prior art or, at least, to provide a commercially viable alternative thereto.

According to a first aspect there is provided a method of producing a coffee powder, the method comprising:

a) providing an aqueous coffee extract comprising from 30 to 55 wt % soluble coffee solids and from 1 to 10 wt % oil, wherein the aqueous coffee extract consists of water and coffee-derived components;
b) subjecting the aqueous coffee extract to a two stage homogenisation process, wherein the first stage is conducted at 200 to 1000 Bar and the second stage is conducted at 10 to 100 Bar, to provide a homogenised coffee extract;
c) spray-drying the homogenised coffee extract.

DETAILED DESCRIPTION

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention provides a method for the manufacture of a coffee powder and, in particular, a spray-dried coffee powder. A spray-dried coffee powder is considered to be an “instant” coffee product since it will substantially immediately form a beverage on the addition of hot water (e.g. 80 to 95° C.). Such products may be supplemented by the addition of a small amount of finely ground roast and ground coffee to improve the flavour or appearance, as is well known in the art. This can be added before or after the spray-drying step.

The present application refers to “solids”. These are the matter which remains after all water has been removed. Accordingly, if you take a coffee beverage and remove the water (by evaporation) you will be left with coffee solids. These coffee solids will comprise soluble coffee solids and insoluble coffee solids. The insoluble coffee solids will include roast and ground coffee material as well as coffee oils. A further distinction is made herein for the insoluble coffee sediment fraction which is the non-oil portion of the insoluble coffee solids.

Preferably the aqueous coffee extract comprises from 35 to 70 wt % total solids (i.e. soluble and insoluble coffee solids) and more preferably the aqueous coffee extract contains from 45 to 55 wt % total solids. Below 35 wt % total solids the spray-drying process is inefficient with a large amount of water that needs to be removed. Above 70 wt % the solids levels may be so high that spray-drying becomes difficult to spray-dry.

The method comprises providing an aqueous coffee extract comprising from 30 to 55 wt % soluble coffee solids and from 1 to 10 wt % oil, wherein the aqueous coffee extract consists of water and coffee-derived components. The coffee solids primarily comprise soluble coffee solids, but will also contain a portion of insoluble coffee solids including the coffee oils. Desirably the insoluble coffee solids contain a non-oil insoluble coffee sediment fraction. This can be obtained by supplementing an aqueous coffee extract with finely ground roasted coffee material. Alternatively the insoluble coffee sediment fraction will naturally result from the manufacture process. Small levels of insoluble material are present in most instant coffee products, as shown in the examples.

Preferably the aqueous coffee extract contains from 1.5 to 5 wt % coffee oil and more preferably from 2 to 4 wt % coffee oil. It is unusual for soluble coffee to contain such high levels of oil as shown in the examples.

Preferably the aqueous coffee extract comprises from 45 to 55 wt % soluble coffee solids, since this means that less water needs to be removed during drying. This improves the process efficiency.

Preferably the aqueous coffee extract is obtained by a new extraction process as described in International Patent application no. PCT/EP2019/086859 filed on 20 Dec. 2019 and incorporated in its entirety herein by reference. This method, as discussed below, inherently provides an aqueous coffee extract with a high amount of coffee oil. In contrast, most known roast and ground coffee extraction techniques produce extracts with low levels of oil, either intentionally to avoid a product which produces slicks on a beverage surface, or inevitably as a consequence of the steps taken. In addition, it has been found that this method inherently provides a non-oil insoluble coffee sediment fraction to improve the body and flavour, without requiring supplementation of the extract.

Advantageously the method therefore avoids the need for a separate step to obtain the coffee oil since it does not rely on the addition of a separate oil source, such as one obtained by expression (pressing and crushing dry beans) or a solvent extraction (such as with $CO_2$ or an organic solvent). Rather, when coffee beans are very finely ground (<600 microns) it has been found that they release naturally high levels of coffee oils when subjected to a slurry extraction. Accordingly, the preferred method employed herein does not have any step of adding a coffee oil to an aqueous coffee extract.

The process of the first aspect described herein avoids the presence of surface oil slicks, but the further addition of the homogenisation step discussed herein provides additional unexpected advantages. In particular, the sensorial profile including the taste and mouthfeel are changed and improved. Without wishing to be bound by theory, it is speculated that the stable oil and water emulsion produced serves to better protect desirable aroma components in the coffee during the spray-drying process. The stable oil and water emulsion further permits the inclusion of higher levels of aroma added back into the coffee, such that a highly aromatised product can be obtained. That is, not only does the coffee oil protect aroma in the coffee, it has surprisingly been found to protect a larger proportion of volatile aroma compounds added to the spray-dried coffee extract.

The method further comprises subjecting the aqueous coffee extract to a two stage homogenisation process, wherein the first stage is conducted at 200 to 1000 Bar and the second stage is conducted at 10 to 100 Bar, to provide a homogenised coffee extract. Homogenisation equipment is well known in the field of beverages and is particularly used in dairy processing for stabilising emulsions. The provision of a two-step process is especially preferred because a single stage tends to cause coalescence and clustering of the oil. Moreover, the use of a high pressure step, followed by a low pressure step gives a more stable emulsion. The inventors have found that a homogeniser is the only way to achieve the desirable very fine oil in water emulsion required for the advantageous final product.

Preferably the first stage is conducted at 500 to 1000 Bar, such as 600 to 800 Bar. These higher ranges for the first step have been found to provide a smaller average (D50) oil droplet size having a greater stability. Preferably the second stage is conducted at 10 to 50 Bar. Such processing conditions have been found to maximise the stability of the emulsion. Homogenisation takes place very quickly for a given portion of the extract and, under the identified conditions the emulsion stays stable for hours if not days.

The coffee extract is preferably homogenised to have a D50 oil droplet size of less than 8 microns, preferably less than 7, more preferably less than 5 and most preferably less than 4, such as preferably from 1 to 7 microns and most preferably 1 to 5 microns, more preferably from 2 to 4 microns, more preferably 2.5 to 3.5 microns. The inventors have found that having oil droplets in this size range persist in the reconstituted beverage obtained from the spray-dried powder and provide an improved perception of creaminess. In contrast, with larger oil particles the sensation was of a beverage with less body (i.e. waterier). The droplets also persisted during storage of the extract so that no particular process limitations needed to be applied before spray-drying.

The coffee extract is preferably provided to the homogeniser at a temperature of from 40 to 90° C. and a pressure of 1.5 to 10 Barg. The temperature is required to ensure the high solids extract is pumpable but without having the temperature degrade the composition.

Lastly, the method involves spray-drying the homogenised coffee extract. Spray-drying processes are well known in the art. The product is a spray-dried instant coffee powder. Exemplary spray drying conditions are 40 to 90° C. and 20 to 500 Bar. The product moisture will preferably be between 1 and 5 wt %, such as about 3 wt %.

Preferably the homogenised extract is taken immediately to the spray-dryer without storage. This permits the use of a single high pressure pump to drive the homogenisation and the spray-drying step for energy and processing efficiency. Designs of homogeniser which can be driven with a single pump are known in the art. Preferably the extract is spray-dried with 5 minutes and preferably within about 1 minute of being homogenised.

Before the coffee is spray-dried it may be subject to a gas-injection step. This can take place before or after the homogenisation step with no particular effect on the product. This reduces the density of the final product by increasing the product porosity. An example of a gas-injection method is described in U.S. Pat. No. 5,882,717. The gas may be added in any suitable amount and at any pressure with pressures of from 1 to 500 Barg being known. Preferred pressures are in the range of from 10 to 100 Bar, such as 40 Barg. The addition of gas to the product permits a high oil and high aroma product, together with low density (esp. $CO_2$) or high product crema (esp. $N_2$). It is most preferred that the gas that is injected is Nitrogen to give crema.

As will be appreciated, spray-drying is one of a number of techniques used to produce a coffee powder, including other techniques such as freeze-drying. Freeze-drying involves taking a fresh coffee extract, cooling it to around minus 40 degrees Celsius and then subliming away the moisture content. This leads to an open porous product. In contrast, spray-drying involves spraying a fresh extract into the top of a spray drying tower with a hot circulating gas. The drying of a spray-dried powder is therefore typically faster, hotter and more likely to degrade the extract being treated. The product also tends to have fine closed pores.

From a processing condition, spray-drying is preferred because larger volumes can be processed more quickly. Accordingly, there is a general prejudice amongst consumers that spray-dried coffee may have less of an authentic coffee aroma. This presumably results from loss of volatile coffee solids during the harsher drying process. Therefore freeze-dried products are generally considered to be more premium and are expected to have a better sensorial profile.

However, the present inventors have found that the provision of a high oil content aqueous extract which is subjected to homogenisation before spray-drying leads to an improved product. This is particularly the case where the extract has been supplemented with a recovered aroma fraction since unexpectedly this seems to be preserved through the drying process. As a consequence, the inventors have been able to provide a spray-dried coffee product with a flavour and mouthfeel which meets and even surpasses that of freeze-dried coffee powders.

Therefore, according to a preferred embodiment, the aqueous coffee extract is an aromatised coffee extract. That is, the aqueous coffee extract comprises an aroma fraction obtained from fresh roast and ground coffee.

Aroma recovery process are known in the art and are sometimes referred to as a steam strip. In a typical steam stripping process a column is filled with roast and ground coffee (average particle size 2-3 mm) which is wetted with a small amount of water (~0.5 wt % by weight of the beans) before being contacted with steam. The steam distillate is then recovered as the aroma fraction. This process is preferably conducted such that the aroma strip constitutes from 1 to 15 wt % of the starting weight of the roast and ground coffee (and water). That is, the strip process removes and recovers volatile components comprising a weight fraction of the original coffee. Preferably it is conducted such that the aroma strip constitutes from 5 to 12 wt % and more preferably about 10 wt % of the starting weight of the roast and ground coffee (and water).

Another approach to recovering the aroma involves passing steam through a slurry of more finely ground coffee beans as discussed below. This process is preferably conducted such that the aroma strip constitutes from 1 to 15 wt % of the starting weight of the roast and ground coffee-containing slurry. Preferably it is conducted such that the aroma strip constitutes from 5 to 12 wt % and more preferably about 10 wt % of the starting weight of the slurry. This level of recovery by either technique obtains the majority of volatile flavour and aroma compounds without requiring the recovery of an undue water portion.

The obtained steam distillate from either of the above processes contains a considerable amount of water, such that the coffee aroma components may be only from 0.1 to 5 wt %, preferably from 1 to 3 wt % of the coffee aroma fraction. Accordingly, when it is added to aromatise a coffee extract it will have a diluting effect on the coffee solids.

Preferably a method of providing the aromatised coffee extract comprises:

(i) providing roast and ground coffee;

(ii) contacting the roast and ground coffee with water to form a coffee composition;

(iii) subjecting the coffee composition to an aroma-separation step to recover a coffee aroma fraction and to form a dearomatised roast and ground coffee, wherein the aroma-separation step recovers from 1 to 15 wt % of the coffee composition as the coffee aroma fraction;

(iv) subjecting the dearomatized roast and ground coffee to one or more aqueous extraction steps to provide an intermediate coffee extract having 35 to 70 wt % coffee solids;

(v) adding the coffee aroma fraction to the intermediate coffee extract to form the aromatised coffee extract.

The roast and ground coffee preferably comprises *Arabica* coffee beans and optionally consists of these beans, since they naturally contain higher levels of coffee oils. When using conventional methods to obtain a coffee extract, the roast and ground coffee will have an average particle size of about 2-3 mm. Preferably the roast and ground coffee has an average particle size of from 100 to 600 microns as discussed below, since this increases the amount of oil released.

The dearomatised roast and ground coffee is subjected to one or more aqueous extraction steps to provide an intermediate coffee extract having 35 to 70 wt % coffee solids (i.e. soluble coffee solids, coffee oil and any insoluble coffee fraction), preferably 45 to 65 wt % coffee solids. Preferably the solids levels are high, because as noted above the subsequent supplementation with the coffee aroma has a diluting effect. It should be noted that the extraction steps will also involve some concentration step, such as evaporation in an evaporator, to arrive at these levels of solids. Such steps are conventional in extraction and spray-drying processes for obtaining coffee powders.

Extraction steps are well known in the art and preferably the coffee is subjected to a number of steps with each recovering a different coffee extract fraction. As each successive step involves a higher temperature, different coffee components are recovered and the overall yield increase. By having sequential steps, heat sensitive components can be separately recovered from those which require more aggressive conditions to hydrolyse and become soluble coffee components.

A typical primary extraction may take place at 140 to 175° C., whereas a secondary extraction might be at 180 to 205° C., with the option for further even higher extraction to take place, such as from 205 to 220° C.

Preferably the aromatised coffee extract contains the coffee aroma fraction and the intermediate coffee extract in a weight ratio of coffee aroma fraction to intermediate coffee extract of from 2:5 to 1:20. That is, the stripped aroma fraction is added to the intermediate coffee extract in accordance with these weight ratios. As can be seen, the addition will lead to significant reduction of the solids content. For example, two parts of a coffee aroma fraction (mostly water) added to 5 parts of a 70% solids intermediate coffee extract would provide an aromatised coffee extract having about 50% coffee solids. More preferably the aromatised coffee extract contains the coffee aroma fraction and the intermediate coffee extract in a weight ratio of coffee aroma fraction to intermediate coffee extract of from 1:5 to 1:10.

More broadly, the coffee aroma fraction that is added back to the intermediate coffee extract will depend on the fraction of the aroma recovered from the roast and ground coffee and water. Within a broader range of the amount of aroma recovered (i.e. from 1 to 15 wt % strip, the ratio of coffee aroma fraction to intermediate coffee extract is preferably from 1:40 to 30:40. Within the intermediate range of the amount of aroma recovered (i.e. from 5 to 12 wt % strip, the ratio of coffee aroma fraction to intermediate coffee extract is preferably from 5:40 to 24:40. In the region of about 10 wt % strip the ratio of coffee aroma fraction to intermediate coffee extract is preferably from 10:40 to 20:40 (i.e. 1:4 to 1:2).

The coffee aroma fraction is very desirable for aromatising the coffee extract since it improves the sensorial profile of the product aroma. The provision of the homogenisation step now has been found to permit a much larger portion of the aroma compounds in the aroma fraction to survive the spray-drying process, such that the product has a much improved aroma profile. Moreover, the fine distribution of oil droplets has been found to improve the associated mouthfeel and beverage texture.

The preferred method for obtaining the aqueous coffee extract, which is described in PCT/EP2019/086859, will now be described in more detail. This method utilizes a new extraction process which can fundamentally change the flavour and taste of instant coffee, while still only relying on water extraction. Key parameters driving these changes are through using a much finer grind size in combination with lower extraction and hydrolysis temperatures, but without compromising the yield of the process.

One advantage of the process is that it can be conducted in a fully continuous manner. This saves cost and complexity in the processing apparatus. Another benefit is that it can be operated with lower amounts of water, which is of course environmentally desirable, but also leads to large energy savings when aiming to provide dried powders, since less water needs to be removed.

The process also uses a lower than conventional temperature in the initial heat treatment which encourages the recovery of more desirable coffee flavours. Since the method has a higher temperature secondary heat treatment, this ensures that the high yield is maintained.

Furthermore, the process provides a coffee product which has an improved flavour and taste. In particular, the flavour and taste are surprisingly different from products obtained by conventional methods, such that the beverage has a thicker mouthfeel and better flavour notes.

The method comprises a number of steps. It will be apparent that a number of these steps must be conducted sequentially on a given portion of the material being processed, but it should also be appreciated that the steps can be conducted as part of a continuous process, batchwise or a combination of the two.

According to the first step (step (i)), a roast and ground coffee is provided having a mean particle size of from 100 to 600 microns, preferably 200 to 600 microns. The roast and ground coffee is obtained from coffee beans which have been roasted and ground using well established techniques in the art. The mean particle size is the D50, as measured using a Helos dry laser diffractometer under standard measurement conditions.

The grind size adopted here is much finer than that employed for conventional coffee extraction processes which typically use particle sizes of about 2 mm. The fine particle size allows the formation of a pumpable slurry, while increasing the surface area for extraction. Conversely, the energy required to grind the coffee to this size is not too great and does not result in undesirable heat-degradation of the beans during grinding.

Preferably the roast and ground coffee is ground to a mean particle size of from 200 to 400 microns, more preferably 250 to 350 microns, which is in the region of particle sizes conventionally ground for the production of expresso coffee beverages. This is particularly advantageous since, as explained below, less water needs to be added to make a slurry. Moreover, below 250 microns the filtration becomes harder and less efficient. At particle sizes below 100 microns the particles can block the filter.

In another embodiment, preferably the roast and ground coffee has a mean particle size of from 400 to 600 microns. This is particularly advantageous for making liquid coffee concentrates. This is because for liquid product it is better to have larger particles to reduce oil content in the product, since oil contributes to crema instability in liquids. The larger particle size releases less oil into the obtained extract.

According to a further step (step (ii)), the roast and ground coffee is mixed with water to form a first slurry containing 15 to 30 wt % coffee solids. That is, water is added to the coffee beans in a ratio such that the coffee beans provide 15-30 wt % of the whole mixture, preferably 20 to 25 wt %. The coffee solids include insoluble coffee solids as well as soluble coffee solids, some of which will dissolve into the added water. This level of water provides a pumpable slurry. The amount of water required for a pumpable slurry depends on the size of the grind employed: a coarser grind requires more water for pumpability. With a grind size of about 250 microns, it is readily possible to use a dilution to achieve, for example, 25% solids. With a grind size of about 100 microns, it is readily possible to use a dilution to achieve, for example, 30% solids. However, at a particle size of 400 to 600 microns, it is desirable to add more water, such as to achieve 15% solids.

According to a further step (step (iii)), the first slurry is passed through an aroma-separation step to recover a coffee aroma fraction and to form a dearomatised slurry. Aroma separation systems are well known in the soluble coffee production field. An exemplary treatment unit is a spinning cone column which can be operated to extract the aroma. This involves the introduction of steam into the slurry which strips aroma from the coffee which can be recovered as an aqueous aroma stream which is stored for later use. Step (iii) may be conducted under vacuum.

The temperature of the slurry in the aroma-separation step can be adjusted as required, but is typically in the region of 70 to 100° C., such as 90 to 100° C., at the start of the treatment. This heat treatment (i.e. the aroma separation) is preferably conducted for from 10 seconds to 2 hours, 1 minute to 25 minutes, preferably 1 to 5 minutes. In an alternative embodiment the duration may be 15 to 25 minutes. The temperature may, of course, be affected by steam addition, if this is the aroma recovery technique employed. Aroma separation can be conducted under vacuum.

The temperature of the slurry can be elevated in advance of the aroma-separation step by heating the added water either before or after the slurry has been formed. The temperature change can be effected using heat recovered from other steps in the process, such as by using convention heat-exchangers. Preferably the water in step (ii) is at a temperature of from 80 to 100° C. when it is mixed with the coffee. This is because it is cheaper to add hot water than it is to heat it with the beans or to use steam to heat the slurry. If the water is not heated before mixing with the coffee then it is added at a temperature of between 15 and 40° C. and the subsequent slurry is heated to 80 to 100° C. This option has an advantage of improved process simplicity.

At this point in the process, after step (iii), the slurry comprises soluble coffee solids, insoluble coffee solids which have been dearomatised and water.

According to a further step (step (A)), the dearomatised slurry is passed to a first filtration device at a temperature of from 90 to 150° C., preferably 90 to 120° C. and more preferably 90 to 100° C., to form a first coffee extract and a first filter cake. In a preferred embodiment dearomatised slurry is passed to a first filtration device at a temperature of from 140 to 150° C. This process therefore separates the majority of the soluble coffee solids and water from the insoluble coffee solids. The first filtration device can be one of several known filtration systems, including settling tanks, filters and centrifuges. Filters are preferred due to their capacity for efficient continuous processing and versatility in handling fine particles. It is most desired that a continuous filtration device is used. This allows efficient separation of the insoluble solids from the water with recovery rates of the soluble solids of greater than 90%.

The coffee solids in the filter cake can be subjected to washing or pressing to increase the extraction of soluble coffee solids. The first coffee extract, which is a concentrated coffee liquor, may be stored for later use in the process or added directly to a later step in a continuous version of the process.

According to a further step (step (B)), water is added to the first filter cake to form a reconstituted slurry having at least 12 wt % coffee solids. That is, water is added in an amount necessary to produce a slurry typically having slightly lower solids levels than in the first slurry formation step. Preferably the reconstituted slurry formed in step (e) has 12 to 30 wt % solids, more preferably 12 to 20 wt %. This level of solids is selected to achieve desirable pumpability. Again the reconstitution can be effected with heated water as necessary.

Preferably the water in step (B) is at a temperature of from 80 to 100° C. This is because it is cheaper to add hot water and this also helps to achieve part of the temperature required in the following step. The heat may be recovered from other steps in the process.

According to a further step (step (C)), the reconstituted slurry is thermally treated at a temperature of from 150 to 205° C., preferably from 170 to 205° C. and more preferably from 180 to 205° C. This heating is preferably conducted at an elevated pressure in order to enhance the extraction rate. A preferred pressure is from 2 to 30 Bar, such as 15 Bar. This heat treatment is preferably conducted for from 5 minutes to 2 hours, preferably 5 to 15 minutes, preferably 5 to 10 minutes. In an alternative embodiment the duration may be 15 to 25 minutes. During this step some of the insoluble coffee solids are hydrolysed into soluble solids which can then be recovered. This step may be conducted using a plug flow reactor.

At this point in the process the slurry again comprises soluble coffee solids, insoluble coffee solids and water. This can be subjected to a flash treatment where a pressure drop allows the removal of any unwanted aroma flavours.

According to a further step (step (D)), the thermally-treated reconstituted slurry is passed to a second filtration device to form a second coffee extract and a second filter cake. The filtration device may be any filtration device as discussed above. This serves to separate a coffee liquor containing dissolved soluble coffee solids from the insoluble coffee solids. The second filter cake can again be washed and/or pressed to recover additional coffee extract. The second coffee extract generally has a lower soluble solids concentration than the first coffee extract.

The second coffee extract, which is a concentrated coffee liquor, may be stored for later use in the process.

According to a further step (step (E)), the first and second coffee extracts are combined to form a third coffee extract. The two coffee extracts are generally combined to provide the third by simple mixing.

According to a further step (step (F)), the third coffee extract is concentrated to form a fourth coffee extract having 35 to 70 wt % coffee solids, preferably 35 to 65 wt % and more preferably 40 to 50%. When adding in the aroma in the following step (v), a level of solids of from 55 to 60% after step (F) is preferred in order to allow the dilution to achieve a useful final concentration. This serves to provide a coffee extract suitable for use as a concentrate (i.e. flowable) or for use in a drying process to produce a dried product (i.e. less water to remove). Preferably step (F) is conducted in an evaporator unit.

According to a further step (step (v)), the coffee aroma fraction (from step (iii)) is added to the fourth coffee extract (also identified herein as the intermediate coffee extract) to form an aromatised coffee-extract which is then homogenised and spray-dried in steps (b) and (c). This improves the flavour of the extract without compromising the solids level. The aroma is added back after the concentration step to avoid loss of the limited amounts of the aroma from the product. The resultant coffee extract preferably has 35 to 65 wt % and preferably, 45 to 65 wt % coffee solids.

The coffee-extract product is a soluble powder. That is, the method further comprises a step (c) of spray drying the aromatised coffee-extract to form a soluble powder. Preferably the powder product has a mean particle size of from 200 to 3000 microns, more preferably 500 to 2000 microns. The product can be agglomerated in the spray-drier or a fluidised bed, or by any other known technique, to adjust the particle size as desired.

The coffee solids remaining after step (D) can be processed as a waste stream and may be incinerated to provide energy for the process (such as for heating water). Alternatively, the second filter cake may be subjected to a further high temperature extraction process to obtain a further coffee extract to be combined in step (E) with the first and second coffee extracts to form the third coffee extract. Suitable conditions for this further high temperature processing step are temperatures of from 190 to 215° C. This heat treatment is preferably conducted for from 5 minutes to 2 hours, preferably 15 to 25 minutes. This further step may be conducted using a further set of slurry formation and filtration steps, or using a conventional extraction technique.

In general, the method involves the use of less water than a conventional extraction method. The use of high solids levels reduces energy consumption for the associated concentration steps. The process also allows for efficient recycling of heat between the different stages with the addition of heated water at different stages and heat which can be recovered from the high temperature extraction step products.

Preferably the method further comprises packaging the coffee-extract product.

Preferably the method further comprises an agglomeration step to improve the solubility and increase the particle size of the final product. This also avoids problems with dusting and fines.

According to a further aspect there is provided a coffee-extract product obtainable by the method described herein.

The finished instant coffee product shows an improved flavour with less process flavours and an improved flavour closer to freshly brewed coffee. Undesired process sourness created through processing at higher temperatures is also reduced.

According to a further aspect there is provided a spray-dried coffee powder for forming a coffee beverage,

- wherein the powder comprises particles comprising soluble coffee solids and insoluble coffee solids, the insoluble coffee solids comprising coffee oils and an insoluble coffee sediment fraction which is the non-oil portion of the insoluble coffee solids,
- wherein the powder comprises at least 6 wt % of the insoluble coffee sediment fraction, the insoluble coffee sediment fraction comprising, when analysed after acid hydrolysis, 1 wt % or less arabinose,
- wherein the powder comprises at least 0.8 wt % coffee oils by dry weight, and
- wherein the particles exhibit less than 20 wt % surface coffee oil, based on the total weight of coffee oils.

According to a further aspect there is provided a spray-dried coffee powder for forming a coffee beverage,

- wherein the powder comprises particles comprising soluble coffee solids and insoluble coffee solids, the insoluble coffee solids comprising coffee oils and an insoluble coffee sediment fraction which is the non-oil portion of the insoluble coffee solids, wherein the powder comprises at least 6 wt % of the insoluble coffee sediment fraction, the insoluble coffee sediment fraction comprising, when analysed after acid hydrolysis, 1 wt % or less arabinose, wherein the powder comprises at least 0.8 wt % coffee oils by dry weight, and wherein, when reconstituted in water, the powder provides a particle size distribution of oil droplets having a D50 oil droplet size of less than 8 microns, less than 7 microns, more preferably less than 5 microns and most preferably less than 4 microns, such as from 1 to 7 microns and most preferably 1 to 5 microns, more preferably from 2 to 4 microns, more preferably 2.5 to 3.5 microns.

According to a further aspect there is provided a spray-dried coffee powder for forming a coffee beverage, wherein the powder comprises particles comprising soluble coffee solids and insoluble coffee solids, the insoluble coffee solids comprising coffee oils and an insoluble coffee sediment fraction which is the non-oil portion of the insoluble coffee solids, wherein the powder comprises at least 6 wt % of the insoluble coffee sediment fraction, the insoluble coffee sediment fraction comprising, when analysed after acid hydrolysis, 1 wt % or less arabinose, wherein the powder comprises at least 0.8 wt % coffee oils by dry weight, and wherein the powder is obtainable by spray-drying an aromatised aqueous coffee extract. By aromatised aqueous coffee extract it is meant an aqueous coffee extract which includes a coffee aroma fraction and a coffee extract, wherein the coffee aroma fraction is a obtained by performing a 5 to 12 wt % strip of fresh roast and ground coffee beans, preferably about 10 wt %, and wherein the aromatised coffee extract contains the coffee aroma fraction and the coffee extract in a weight ratio of coffee aroma fraction to coffee extract of from 2:5 to 1:20. By fresh it is meant that they have not been previously extracted.

The following discussion of preferred features applies to all of the aspects of the invention relating to spray-dried coffee powders. Moreover, these aspects can all be freely combined with the other aspects discussed herein.

The present inventors have found that the above described process leads to a unique spray-dried coffee powder. In particular, the product has an improved aroma and mouthfeel compared to conventional commercially available coffee products. The presence of the high oil content and the subsequent homogenisation has been found to provide an improved mouthfeel and to better preserve aroma components returned to the coffee in the aroma add-back step. This permits the provision of a new and improved soluble coffee product rivalling the performance of premium freeze-dried coffees.

The product is characterised in part by (i) comprising at least 6 wt % of the insoluble coffee sediment fraction, the insoluble coffee sediment fraction comprising, when analysed after acid hydrolysis, 1 wt % or less arabinose; and (ii) comprising at least 0.8 wt % coffee oils by dry weight. These features are characteristic of the slurry extraction process described herein. In particular, the very fine grind size of the coffee being extracted provides the higher oil yield. Moreover, the fine size and the slurrying steps leads to the incorporation of the sediment fraction with the characteristic arabinose levels, indicative of the partial extraction of the insoluble material during the coffee processing steps. Thus, the soluble coffee product is one inherently produced by the described method.

Furthermore, the provision of the low surface oil is a consequence of the stable oil in water emulsion achieved by the homogenisation step. Accordingly, the product has unique characteristics of the product from which it has been obtained which would not be observed in other processing methods. Preferably the product of the further aspect is obtainable by the method described herein.

When coupled to the method of PCT/EP2019/086859 and as discussed herein, the process results in the presence of an insoluble coffee sediment fraction within the product and a higher level of oil as a direct consequence of the process without requiring separate oil addition or the addition of roast and ground coffee. Thus the process is an elegant approach to providing an improved product with a high yield from roast and ground coffee.

The insoluble coffee fraction superficially resembles the roast and ground coffee additive often added to coffee products to improve the aroma of conventional coffee extracts. However, the insoluble coffee sediment fraction is present in the product as a direct consequence of the process and does not require an additional step of supplementing the coffee extract with roast and ground coffee. Accordingly, the product of the invention can be characterised by the presence of an insoluble coffee sediment fraction which distinguishes over commercially available coffee products which have not been supplemented with additional roast and ground coffee.

Surprisingly, the inventors have found that the insoluble coffee sediment fraction obtained as a direct consequence of the process is less likely to sediment out of the extract than a post-added roast and ground coffee extract. This is observed in the final beverage where there is markedly reduced sediment or scum deposited on the wall of a receptacle after the beverage is swirled within the receptacle.

The insoluble coffee sediment fraction obtained with the process described above further differs from the insoluble coffee sediment fraction observed for coffees with a conventional addition of a roast and ground coffee additive. This is because the fraction has undergone the coffee extraction process, being exposed to heated aqueous environments, which changes the balance of carbohydrates in the insoluble coffee material. Accordingly, the product of the invention can be characterised by a carbohydrate analysis of the insoluble coffee sediment fraction which distinguishes over commercially available coffee products which have been supplemented with additional roast and ground coffee.

In addition, the process results in a higher oil fraction in the coffee product. This is a consequence of the finer coffee particle grind size used in the method. Since a finer grind exposes more surface area of the coffee for extraction, it is understood that a greater amount of oil is released in the extraction process. Accordingly, the product of the invention can be characterised by the presence of a higher oil fraction which distinguishes over commercially available coffee products obtained by conventional extraction processes.

The insoluble coffee sediment fraction is the sediment obtained using the repeated centrifugation process described herein. It represents the solid material (not oils) present in the product which are insoluble in water.

The compositions preferably comprises from 7.5 to 15 wt % of the insoluble coffee sediment fraction. This amount of the insoluble coffee sediment fraction provides a well-balanced aroma without having an unduly large amount of insoluble material which can adversely affect the mouthfeel and can cause undesirable sediment.

Preferably the insoluble coffee sediment fraction comprises, when analysed after acid hydrolysis, from 0.5 to 1 wt % arabinose.

Preferably the insoluble coffee sediment fraction comprises, when analysed after acid hydrolysis, less than 5 wt % galactose, preferably from 2 to 4 wt % galactose.

Preferably the instant coffee composition comprises at least 1 wt % coffee oils by dry weight, preferably from 1.5 to 5 wt % coffee oils, preferably from 2 to 4 wt %. The increased levels of oil improve the mouthfeel of the product. Higher levels of oil improve the mouthfeel while also increasing the yield by weight obtained and used from the coffee beans. The oil is obtained as a consequence of the process and has been found to be well distributed within the extract, helping to improve the mouthfeel without undesirable oil slicks being visible on the final beverage.

Preferably the particles exhibit less than 20 wt % surface coffee oil, based on the total weight of coffee oils. The surface oil can be determined by a solvent extraction technique. An exemplary solvent extraction technique is discussed in the examples below. Preferably the particles exhibit less than 15 wt % surface coffee oil, and preferably less than 10 wt %, based on the total weight of coffee oils. Without wishing to be bound by theory, it is considered that this low level of surface oil is a direct consequence of the homogenisation step as described herein. In particular, by providing a finer and better dispersed oil in water emulsion throughout the extract before spray-drying, the emulsion is less disturbed by the spray-drying process. Therefore the oil remains well distributed throughout the particles rather than coalescing at the surface. It is believed that this contributes to the improved product performance since the fine oil structure can be retained on reconstitution in a beverage medium (i.e. hot water at 80 to 95° C.).

In particular, the particles preferably exhibit less than 20 wt % surface coffee oil, based on the total weight of coffee oils, such as less than 19 wt %, such as less than 18 wt %, such as less than 17 wt %, such as less than 16 wt %, such as less than 15 wt %, such as less than 14 wt %, such as less than 13 wt %, such as less than 12 wt %, such as less than 11 wt %, such as less than 10 wt %, such as less than 9 wt %, such as less than 8 wt %, such as less than 7 wt %, such as less than 6 wt %, such as less than 5 wt %, such as less than 4 wt %, such as less than 3 wt %, such as less than 2 wt %, such as less than 1 wt %, based on the total weight of coffee oils.

Preferably the spray-dried coffee particles when reconstituted in water provide a particle size distribution of oil droplets having a D50 oil droplet size of less than 8 microns, less than 7 microns, more preferably less than 5 microns and most preferably less than 4 microns, such as from 1 to 7 microns and most preferably 1 to 5 microns, more preferably from 2 to 4 microns, more preferably 2.5 to 3.5 microns. This particle size can be determined using confocal laser scanning microscopy, such as with a Zeiss Z2M machine. The samples can fluorescently labelled and imaged using confocal laser scanning microscopy (CLSM) using the lipid stain BODIPY™ to localise the oil droplets within the emulsions. Imaging can be performed using a 488 nm laser and a band pass filter of 490-555 nm, with the areas of fat pseudo coloured green. Particle size results can be successfully measured using image analysis to ignore non-spherical or brown coffee particles. A representative sample of at least 1000 oil droplets should be measured. The samples are observed at standard beverage concentrations of around 1.5 wt % solids.

Preferably the instant coffee composition when dissolved and analysed by wet laser diffraction at a 1.5 wt % concentration (solids) has unimodal particle size distribution. This distinguishes over those products where roast and ground coffee is added as a supplement to a soluble coffee powder (generally in the coffee extract before drying). Specifically, conventionally milling techniques which fracture coffee beans generally give rise to a bimodal distribution based on the fracturing of the coffee beans, with a lower peak resulting from the finest cell wall fragments. In contrast, the retained coffee particles after the method of the invention, or which are retained in a conventional extract having escaped a percolation column, have a bimodal distribution.

Preferably under the same particle measurement the instant coffee composition when dissolved also has a D50 of less than 10 microns, preferably from 2.5 to 7.5 microns. This fine particle size reflects the influence on the extract obtained from the above described coffee process. Indeed, the particle size distribution observed is unusual, since the D90 is typically greater than 30 microns, reflecting a broad particle size distribution.

The composition consists of coffee. That is, the coffee composition does not include any non-coffee components or additives (such as emulsifiers or dairy ingredients). As will be appreciated, however, the spray-dried coffee powder can be mixed with other non-coffee components such as sugar or milk powder to provide final composite products, such as three-in-one mixes.

The quantification and analysis of the insoluble coffee sediment fraction requires the separation of the insoluble coffee solids from the soluble coffee solids. In order to facilitate this assessment for a liquid coffee product, it is necessary to dry the product to a powder so that the same analysis can be performed.

To isolate and quantify the insoluble coffee sediment fraction (also known as sediment), 30 grams of a given coffee sample (dry powder) is added to 70 grams of boiling water and shaken for 2 minutes. The sample is then centrifuged for 15 minutes at 10,000 g. After centrifugation the supernatant is decanted off and the sediment re-dissolved with 70 grams of boiling water, shaken for 2 minutes and then centrifuged again under the same conditions as above. This washing process is repeated 3 times for a total of four centrifugation steps. The sediment from the final wash is then freeze dried and then the sediment percentage is related to the starting sample of 30 g (e.g. 1.8 g of sediment represents a 6 wt % insoluble coffee sediment fraction). Before any analysis is carried out the dried sediment sample is homogenised by simple stirring.

In view of the method for analysing the insoluble coffee sediment fraction, the fraction does not include any coffee oils which may be present, even though these would also be considered insoluble. This is because the oil will be readily separated in the centrifugation steps.

To test the carbohydrates within the isolated insoluble coffee sediment fraction a total carbohydrate analysis is carried out using high performance anion exchange-pulsed amperometric detection (HPAEC-PAD), according to ISO 11292-1995. The sample is prepared by mixing the already-isolated sediment with 50 ml of 1M HCl and then shaking the sample for 150 minutes at 95° C. Quantification of the monosaccharides are carried out by analysing external standards of the monosaccharides as usual.

To determine the particle size distribution of the instant coffee product a Particle size distribution analysis was carried out using a Malvern® Mastersizer 3000 with Hydro MV tank. 1.5 g of sample (±0.0005 g) was made up to 100 g (±0.05 g) with deionised water boiled at 100° C., stirred for 60 seconds, cooled slightly, and added dropwise into the Malvern® unit to achieve obscuration around 10%. An average of 3 readings were taken. Again, in order to facilitate this assessment for a liquid coffee product, it is necessary to dry the product to a powder so that the same analysis can be performed.

To determine the oil content, samples of the product (firstly dried if the product is a liquid coffee concentrate) were assessed using Soxtec® H6. 2 g of sample was mixed with Petroleum Ether 40-60, boiled for 2 hours and then rinsed for approx. 0.5 hours. The resulting condensate is then heated to recover the solvent. The assessment of oil levels in this way is well known in the art.

In some embodiments the instant coffee compositions of the present invention may be blended with a conventional spray-dried coffee obtained by known methods. For example, a product might contain 10-100%, such as 20 to 50% of the coffee described herein, blended with the balance of a conventional coffee. While this can be readily achieved for a liquid product, a soluble product might be formed from a mixed liquid extract or by dry mixture of different powder products. This may be advantageous where the mouthfeel and taste benefits of the invention are to be moderated to provide a closer to conventional beverage experience.

According to a preferred embodiment, there is provided a method of producing a coffee powder, the method comprising:

(a) providing roast and ground coffee having a mean particle size of from 100 to 600 microns;
(b) mixing the roast and ground coffee with water to form a first slurry containing 15 to 30 wt % coffee solids,
(c) passing the first slurry through an aroma-separation step to recover a coffee aroma fraction and to form a dearomatised slurry;
(d) passing the dearomatised slurry to a first filtration device at a temperature of from 90 to 150° C. to form a first coffee extract and a first filter cake;
(e) adding water to the first filter cake to form a reconstituted slurry having at least 12 wt % coffee solids;
(f) thermally treating the reconstituted slurry at a temperature of from 150 to 205° C.;
(g) then passing the thermally-treated reconstituted slurry to a second filtration device to form a second coffee extract and a second filter cake;
(h) combining the first and second coffee extracts to form a third coffee extract;
(i) concentrating the third coffee extract to form a fourth coffee extract having 35 to 70 wt % coffee solids;
(j) adding the coffee aroma fraction to the fourth coffee extract to form an aqueous coffee-extract comprising from 30 to 55 wt % soluble coffee solids and from 1 to 10 wt % oil, preferably 2 to 5 wt % oil, wherein the aqueous coffee extract consists of water and coffee-derived components;
(k) subjecting the aqueous coffee extract to a two stage homogenisation process, wherein the first stage is conducted at 200 to 1000 Bar and the second stage is conducted at 10 to 100 Bar, to provide a homogenised coffee extract;
(l) spray-drying the homogenised coffee extract to form a coffee powder.

According to a preferred embodiment, there is provided a method of producing a coffee powder, the method comprising:

(a) providing roast and ground coffee having a mean particle size of from 100 to 600 microns;
(b) mixing the roast and ground coffee with water to form a first slurry containing 15 to 30 wt % coffee solids,
(c) passing the first slurry through an aroma-separation step to recover a coffee aroma fraction and to form a dearomatised slurry, wherein the aroma-separation step recovers from 1 to 15 wt % of the coffee composition as the coffee aroma fraction, preferably from 8 to 12 wt % and most preferably about 10 wt % of the coffee composition as the coffee aroma fraction;
(d) passing the dearomatised slurry to a first filtration device at a temperature of from 90 to 150° C. to form a first coffee extract and a first filter cake;
(e) adding water to the first filter cake to form a reconstituted slurry having at least 12 wt % coffee solids;
(f) thermally treating the reconstituted slurry at a temperature of from 150 to 205° C.;
(g) then passing the thermally-treated reconstituted slurry to a second filtration device to form a second coffee extract and a second filter cake;
(h) combining the first and second coffee extracts to form a third coffee extract;
(i) concentrating the third coffee extract to form a fourth coffee extract having 35 to 70 wt % coffee solids;
(j) adding the coffee aroma fraction to the fourth coffee extract to form an aqueous coffee-extract comprising from 30 to 55 wt % soluble coffee solids and from 1 to 10 wt % oil, preferably 2 to 5 wt % oil, wherein the aqueous coffee extract consists of water and coffee-derived components and wherein the aromatised coffee extract contains the coffee aroma fraction and the intermediate coffee extract in a weight ratio of coffee aroma fraction to intermediate coffee extract of from 2:5 to 1:20, preferably from 1:10 to 3:10 and most preferably about 1:5;
(k) subjecting the aqueous coffee extract to a two stage homogenisation process, wherein the first stage is conducted at 200 to 1000 Bar and the second stage is conducted at 10 to 100 Bar, to provide a homogenised coffee extract;
(l) spray-drying the homogenised coffee extract to form a coffee powder.

These preferred embodiments can be freely combined with all further features of the first aspect.

DESCRIPTION OF THE DRAWINGS

The invention will now be described further with respect to the figures, in which:

FIG. 1 shows a flow-chart of the steps of the present invention.

As shown in FIG. 1, the method for the manufacture of a coffee-extract product includes a number of steps.

In step (a) roast and ground coffee 2 is provided having a mean particle size of from 100 to 600 microns, preferably 200 to 600 microns. Within this range, larger sizes are favoured for liquid extract products, whereas smaller sizes are favoured for dried soluble coffee products.

In step (b) the roast and ground coffee is mixed with water 5 to form a first slurry 10 containing 15 to 30 wt % coffee solids. The water 5 is added at a temperature of from 80 to 100° C., and preferably from 90 to 95° C. The solids level is determined by the particle size, since a minimum amount of water 5 is used as necessary to obtain a pumpable slurry 10.

The larger the particle size, the more water 5 is required (the lower the solids) to achieve a pumpable slurry 10.

In step (c) the first slurry 10 is passed through an aroma-separation step to recover a coffee aroma fraction 15 and to form a dearomatised slurry 20. A typical approach to this method involves the addition of steam 21 to the pumpable slurry 10 where the vapours are treated in a spinning cone treatment unit. The recovered aroma fraction 15 is about 10 wt % of the first slurry 10, such that the dearomatised slurry 20 is 90 wt % of the slurry 10.

In step (d) the dearomatised slurry 20 is passed to a first filtration device at a temperature of from 90 to 150° C., such as 90 to 100° C., to form a first coffee extract 25 and a first filter cake 30. The temperature is retained from the preceding step or can be further increased to increase the extraction yield. The filter cake 30 may be washed and is pressed to obtain the largest possible amount of soluble coffee solids.

In step (e) water 5 is added to the first filter cake 30 to form a reconstituted slurry 35 having at least 12 wt % coffee solids. The water 5 is preferably hot and there may be mechanical agitation to break up the first filter cake 30. The amount of water required to reconstitute a slurry tends to be higher than that required in step (b).

In step (f) the reconstituted slurry 35 is thermally treated at a temperature of from 150 to 205° C., such as 180 to 205° C. to form a thermally-treated reconstituted slurry 40. That is, it is pumped through a heat-treatment unit, such as a plug-flow reactor. Residence times in the heat treatment are typically at least 5 minutes to ensure good extraction.

In step (g) the thermally-treated reconstituted slurry 40 is passed to a second filtration device to form a second coffee extract 45 and a second filter cake 50. The second filter cake 50 may be washed and is pressed to obtain the largest possible amount of soluble coffee solids. The temperature in this step may be retained from the preceding step, or may be lowered as heat is recovered for use in step (b), such as down to a temperature of from 80 to 100° C.

The second filter cake 50 may then be burned in step M to produce heat for the process, or may be subjected to a further high temperature extraction step M to obtain a further coffee extract 52.

In step (h) the first coffee extract 25 and the second coffee extract 45 are combined to form a third coffee extract 55. Other aqueous coffee extracts may also be added in this step, such as further coffee extract 52.

In step (i) the third coffee extract 55 is concentrated to form a fourth coffee extract 60 having 35 to 70 wt % coffee solids, such as 35 to 60 wt % coffee solids.

In step (j) the coffee aroma fraction 15 is added to the fourth coffee extract 60 (intermediate coffee extract) to form an aromatised coffee-extract 65. The aroma fraction 15 is added in an amount of one part, relative to five parts of the fourth coffee extract 60.

The aromatised coffee-extract 65 is homogenised in step k in a two-step homogeniser 70 to form a homogenised coffee extract 75. The two-step homogeniser 70 performs a first step at a pressure of 700 Bar and a second step at 50 Bar.

The homogenised coffee extract 75 is spray dried in step (L) to form a dried coffee product 80.

The present invention will now be described further in relation to the following non-limiting examples.

Example 1

Roast whole beans were ground to between 200 μm and 400 μm in a 3 stage roller grinder.

The roast and ground coffee was slurried with water at 20° C.-30° C. at a ratio of 25% Coffee to 75% water.

The slurry was fed forward into a heat exchanger and heated to 95° C. before moving into a spinning cone column where aroma was stripped from the slurry.

Upon exit of the spinning cone the slurry was fed forward through a heat exchanger, raising the temperature to between 120° C. and 150° C. for 2 to 5 minutes.

The slurry was then fed into a filter separating the coffee liquor from the grounds. The grounds were then subjected to 2 further washing steps at 130° C. to 150° C. to remove additional solids.

The grounds were then re-slurried at a ratio of 12% to 17% solids with fresh water. The resulting slurry was fed forward to a hydrolysis step where it was heated to between 180° C. and 205° C. (185° C.) and held for between 5 and 20 minutes.

The resulting slurry was then cooled to below 100° C. before passing through a second filtering step repeating the separation and washing of the first separation step.

The coffee extracts obtained from each filtration step were combined and concentrated. The aroma compounds stripped from the first slurry where then added to the mixture.

The fully combined three components were then subjected to homogenisation at 200 Bar and then 40 Bar. The homogenised extract was spray-dried with a conventional process to obtain a soluble coffee powder.

Example 2

*Arabica* and/or *Robusta* beans were roasted and ground, using a 3-stage roller grinder, to a mean particle size of 300 μm. The ground coffee was then slurried with water at 20-25° C. at a ratio of 25% coffee to 75% water.

The slurry was fed forward into a heat exchanger and heated to 70° C. before moving into a spinning cone column where aroma was stripped from the slurry.

The slurry was then fed into a filter at a temperature of 95° C. separating the coffee liquor from the grounds. The grounds were then subjected to 2 further washing steps to remove additional solids.

The grounds were then re-slurried at a ratio of 12% to 17% solids with fresh water. The resulting slurry was fed forward to a plug-flow reactor (hydrolysis step) where it was heated to 170° C. and held for 5-10 minutes.

The resulting slurry was then cooled to below 100° C. before passing through a second filtering step repeating the separation and washing of the first separation step.

The coffee extracts obtained from each filtration step were combined and concentrated. The aroma compounds stripped from the first slurry where then added to the mixture.

The fully combined three components were then subjected to homogenisation at 200 Bar and then 40 Bar. The homogenised extract was spray-dried with a conventional process to obtain a soluble coffee powder.

The product of this example was found to have more body/mouthfeel than products produced using current technology.

Example 3

A coffee slurry was prepared as described in Example 1.

The slurry was fed forward into a heat exchanger and heated to 95° C. before moving into a spinning cone column where aroma was stripped from the slurry.

Upon exit of the spinning cone the slurry was fed forward through a heat exchanger, raising the temperature to between 145-150° C. for 4 to 5 minutes.

The slurry was then fed into a filter separating the coffee liquor from the grounds. The grounds were then subjected to 2 further washing steps at 140° C. to remove additional solids.

The slurry was then fed into a filter separating the coffee liquor from the grounds. The grounds were then re-slurried at a ratio of 12% to 17% solids with fresh water. The resulting slurry was fed forward to a plug-flow reactor (hydrolysis step) where it was heated to 200° C. and held for 7-10 minutes.

The resulting slurry was then cooled to below 100° C. before passing through a second filtering step repeating the separation and washing of the first separation step.

The coffee extracts obtained from each filtration step were combined and concentrated. The aroma compounds stripped from the first slurry where then added to the mixture.

The fully combined three components were then subjected to homogenisation at 200 Bar and then 40 Bar. The homogenised extract was spray-dried with a conventional process to obtain a soluble coffee powder.

The product of this example was found to have more body/mouthfeel than products produced using current technology.

Example 4

*Arabica* and/or *Robusta* beans were roasted and ground, using a 3-stage roller grinder, to a mean particle size of 400 μm. The ground coffee was then slurried with water at 20-25° C. at a ratio of 15% coffee to 85% water.

The remainder of the process was conducted as per example 1.

The resulting product has lower levels of oil than the product of example 1.

Oil Droplet Assessment

The size of oil droplets in a coffee extract produced according to the method in P1 (see Example 1) was investigated before and after homogenisation at different stage 1 pressures. Stage 2 was at 40 Bar in each case. The time period indicates the stability after the homogenisation.

As shown in the data, the higher pressure gives a greater oil droplet stability over time. Also, the higher pressure gives a smaller D50 size and a narrower distribution range (D90-D10). The concentration of the extract also has an effect on the size and stability. The weak concentrate was only 10 wt % solids, whereas the concentrated extract was at 50 wt % solids.

This demonstrates that for a non-homogenised high oil-extract the D50 value is around 9.6 microns, whereas for a homogenised high oil extract the D50 is much lower at around 3.2 and 2.9. It is noted that the weak extract data falls outside the range of solids claimed and has too much water for spray-drying, but still supports the same trend.

| | | Weak Extract | | | |
|---|---|---|---|---|---|
| Sample | Timepoint | Number of droplets counted | Dv10 (μm) | Dv50 (μm) | Dv90 (μm) |
| Unhomogenised | 0 | 920 | 3.0 | 6.0 | 8.0 |
| Homogenised at | 0 | 4704 | 1.0 | 2.0 | 3.0 |
| 200 bar | 180 mins | 3380 | 1.0 | 2.0 | 3.0 |
| | 1 week | 555 | 4.5 | 12.0 | 18.0 |
| Homogenised at | 0 | 1699 | 0.5 | 1.5 | 2.3 |
| 500 bar | 180 mins | 3429 | 1.0 | 1.8 | 2.8 |
| | 1 week | 1743 | 2.0 | 5.0 | 8.0 |

| | | Concentrated Extract | | | |
|---|---|---|---|---|---|
| Sample | Timepoint | Number of droplets counted | Dv10 (μm) | Dv50 (μm) | Dv90 (μm) |
| Unhomogenised | 0 | 1389 | 5.6 | 9.6 | 12.6 |
| Homogenised at | 0 | 5524 | 1.9 | 3.2 | 4.6 |
| 200 bar | 180 mins | 6085 | 2.1 | 3.4 | 4.6 |
| | 1 week | 3832 | 2.1 | 3.4 | 4.7 |
| Homogenised at | 0 | 6824 | 1.7 | 2.9 | 4.0 |
| 500 bar | 180 mins | 7014 | 1.8 | 3.0 | 4.2 |
| | 1 week | 4944 | 1.8 | 2.9 | 4.0 |

Further Examples

The following examples were performed with the method of PCT/EP2019/086859 (hereafter P1) and are provided at least as comparative evidence of the properties of prior art compositions.

Samples obtained by the method described herein were assessed in comparison to a range of commercially available soluble coffee products. As can be seen from the comprehensive testing, the products obtained by the process are new and can be readily distinguished from products obtained from conventional processes.

Oil Content

| | Sample | Type | Bean blend* | Fat Content |
|---|---|---|---|---|
| 1 | Alta Rica ™ | Pure Instant | Arabica | 0.3 |
| 2 | Nescafe Gold Blend ™ | Whole Bean Instant | Arabica/ Robusta | 0.4 |
| 3 | Kenco Really Rich ™ | Pure Instant | Arabica/ Robusta | 0.2 |
| 4 | Milicano ™ | Whole bean Instant | Arabica/ Robusta | 0.7 |
| 5 | Percol ™ | Pure Instant | Robusta | 0 |
| 6 | Kenco Really Rich ™ | Pure Instant | Arabica/ Robusta | 0.2 |
| 7 | Prototype Colombian | P1 | Arabica | 1.8 |
| 8 | Prototype Central | P1 | Arabica | 1.8 |
| 9 | Prototype Robusta | P1 | Robusta | 0.4 |
| 10 | Prototype Brazil | P1 | Arabica | 3.9 |

*bean identity for competitor products is based on an educated guess

Examples 7, 8, 9 and 10 have been produced in accordance with the method described in P1. Examples 1-6 are commercially available products, of which 2 and 4 are products supplemented with added roast and ground coffee additives (designated "whole bean instant" in the table).

It should generally be appreciated that levels of oil in *Robusta* beans are lower than in *Arabica* beans. This is reflected with the generally lower levels of oil in products comprising *Robusta* beans, include inventive example 9. Sample 10 is a dark Brazil known for high oil levels.

As can be seen, there are low levels of oil in the pure instant coffees, i.e. samples 1, 3, 5 and 6, which have not been supplemented with roast and ground coffee additives. The oil levels are slightly higher in samples 2 and 4 due to the oil content of the roast and ground coffee additives, with sample 2 containing approximately 5% roast and ground coffee and Sample 4 containing more roast and ground coffee.

Samples 7, 8 and 10 contain high levels of oil due to the fine grind of roasted coffee in the process which releases more oil into the extract.

As can be seen, no conventional soluble coffee products contain significant levels of oil. Indeed, it is speculated that the levels of oil observed for some of these products is added afterwards to the surface of the dried powder to improve its aroma.

The only prior art products which contain high oil levels are a consequence of the addition of roast and ground coffee additives in the product. In contrast, the method described in P1 achieves high levels of oil, even for *Robusta* bean products.

Sediment Levels

Sediment levels were determined by taking 30 grams of a given coffee sample added to 70 grams of boiling water and shaken for 2 minutes. The sample is then centrifuged for 15 minutes at 10,000 g. After centrifugation the supernatant is decanted off and the sediment re-dissolved with 70 grams of boiling water, shaken for 2 minutes and then centrifuged again under the same conditions as above. This washing process is repeated 3 times for a total of four centrifugation steps. The sediment from the final wash is then freeze dried and then the sediment percentage is related to the starting sample of 30 g (e.g. 1.8 g of sediment represents a 6 wt % insoluble coffee sediment fraction).

| | Sample | Sediment (wt %) |
|---|---|---|
| 1 | l'Or Intense ™ | 5.2 |
| 2 | Kenco Rich ™ | 4.7 |
| 3 | Carte Noir ™ | 3.8 |
| 4 | Kenco Milicano Americano ™ | 11.5 |
| 5 | Nescafé Gold ™ | 4.4 |
| 6 | Nescafé Azera Americano ™ | 9.3 |
| 7 | P1 Robusta | 11.9 |
| 8 | P1 Colombia Arabica | 7.8 |
| 9 | P1 Centrals Arabica | 9.2 |

Examples 7, 8 and 9 have been produced in accordance with the method described in P1. Examples 1-6 are commercially available products, of which 4, 5 and 6 are products supplemented with added roast and ground coffee additives.

As can be seen, all commercially available instant coffee products have some level of insoluble coffee sediment fraction. This is expected to be small fragments of coffee cell walls which pass through the extraction system into the coffee extracts. The levels of the insoluble coffee sediment fraction typically increase for those products supplemented with added roast and ground coffee additives.

As can be seen, the products produced according to the method described in P1 all have significantly higher levels of insoluble coffee sediment fraction than instant coffee products which have not been supplemented with added roast and ground coffee additives.

Particle Size Distribution

| | sample description | D [3, 2] μm | D [4, 3] μm | Dx (10) μm | Dx (50) μm | Dx (90) μm |
|---|---|---|---|---|---|---|
| 1 | l'Or Intense ™ | 1.84 | 15.7 | 0.79 | 2.85 | 8.49 |
| 2 | Kenco Rich ™ | 2.74 | 42.3 | 1.35 | 3.69 | 11.2 |
| 3 | Carte Noir ™ | 1.96 | 4.73 | 0.897 | 2.79 | 8.63 |
| 4 | Kenco Milicano Americano ™ | 4.32 | 13.1 | 1.6 | 11.7 | 27.3 |
| 5 | Nescafé Gold ™ | 3.4 | 42.5 | 1.1 | 20.1 | 102 |
| 6 | Nescafé Azera Americano ™ | 5.91 | 136 | 2.16 | 31.1 | 197 |
| 7 | P1 Robusta | 3.35 | 8.22 | 1.56 | 4.97 | 14.6 |
| 8 | P1 Colombia Arabica | 2.58 | 33.9 | 1.02 | 4.68 | 37.2 |
| 9 | P1 Centrals Arabica | 2.67 | 33.4 | 1.03 | 5.32 | 34.5 |

Examples 7, 8 and 9 have been produced in accordance with the method described in P1. Examples 1-6 are commercially available products, of which 4, 5 and 6 are products supplemented with added roast and ground coffee additives.

The sediment quantification method with multiple centrifugation steps allows for a large amount of very fine particles to be recovered.

Particle size distribution has been measured with the Malvern® 3000 after making a 1.5% hot brew of the dried product, for example 3 g of dried product in 200 ml of hot water.

3 classes of sediment can be distinguished:

Class 1 L'or Intense™, Kenco Rich™ and Carte Noir™:

Unimodal distribution D10: <1.5 and D90: <15 μm

Relative low amount of sediment<5.5% wt

The very small particle size (such as low D90) perhaps reflects the way in which these particles have escaped from the extraction column into the extract, or mannans which have sedimented in the evaporator.

Class 2: Kenco Millicano™, Nescafe Gold™ and Azera™ Clearly Differs from Class 1 And 3

Bi-modal distribution (2 peaks) peak 1 between 1 and 10 μm and peak 2 between 10 and 100 μm.

Class 3: Inventive Samples

Unimodal distribution but broader distribution than class 1 D10: >1.0 and D90: >15 μm and relative higher amount of sediment such as >7.5% wt.

Carbohydrate Analysis

The analysis is of mono-saccharides after acid hydrolysis.

| | sample description | Arabinose | Galactose | Glucose | mannose | Total |
|---|---|---|---|---|---|---|
| 1 | l'Or Intense ™ | 0.71 | 3.45 | 0.33 | 61.2 | 65.7 |
| 2 | Kenco Rich ™ | 0.48 | 2.43 | 0.31 | 50.9 | 54.1 |
| 3 | Carte Noir ™ | 0.61 | 3.01 | 0.43 | 69.0 | 73.1 |
| 4 | Kenco Milicano Americano ™ | 1.99 | 8.88 | 0.4 | 36.1 | 47.4 |
| 5 | Nescafé Gold ™ | 1.34 | 6.36 | 0.37 | 50.7 | 58.8 |
| 6 | Nescafé Azera Americano ™ | 1.42 | 7.06 | 0.46 | 60.8 | 69.7 |
| 7 | P1 Robusta | 0.77 | 2.47 | 0.28 | 42.4 | 45.9 |
| 8 | P1 Colombia Arabica | 0.74 | 3.08 | 0.41 | 54.5 | 58.7 |
| 9 | P1 Centrals Arabica | 0.76 | 3.51 | 0.45 | 55.2 | 59.9 |

Examples 7, 8 and 9 have been produced in accordance with the method described in P1. Examples 1-6 are commercially available products, of which 4, 5 and 6 are products supplemented with added roast and ground coffee additives.

As can be seen, the insoluble coffee sediment fraction of the products of P1 has a level of Arabinose broadly similar to that of a soluble coffee product which has not been supplemented with roast and ground coffee. Typically it also has a lower level of galactose than a soluble coffee product which has been supplemented with roast and ground coffee Without wishing to be bound by theory, it is considered that the high levels of arabinose in the supplemented products is a consequence of the presence of the unextracted coffee material. In contrast, for the products of P1, the levels are lower reflecting the fact that the arabinose has already been extracted into the soluble coffee fraction by the process of P1.

Sensory Testing 2 prototypes of the product of P1 were combined with product from current technology in a ratio of 30 (POI): 70 (current product). These were then tested in a set with an additional sample of 100% current technology product. The 3 samples were given to a panel of sensory experts who were then asked to pair the products according to similarities/dissimilarities to the third.

The results indicate that even at levels of only 30% in a blend with current products the prototype is considered more viscous/dry and powdery-all attributes contributing to mouthfeel/body. The levels correlate directly with the tribology data. More oil means more lubrication which means more mouthfeel/body. The effects are shown in FIG. 3.

Collapse Temperature

Crystalline products have a well-defined "eutectic" freezing/melting point, this point is called its collapse temperature. When freeze-drying a concentrated coffee extract, the extract is heated up from an initial frozen temperature of about −50° C. under a vacuum. This allows the water content to sublime away. The rate of heating depends on the extract and there is a collapse temperature above which the product will have melt-back and be compromised. The temperature and pressure can then be raised on subsequent cycles until evidence of collapse or melt-back is seen, indicating that the product was too warm. Surprisingly the inventors found that the collapse temperature for several samples of P1 were higher than that for their standard coffee products.

Rheological Behaviour of Samples

| | |
|---|---|
| 1 | Alta Rica ™ |
| 2 | Nescafe Gold Blend ™ |
| 3 | Kenco Really Rich ™ |
| 4 | Milicano ™ |
| 5 | Percol ™ |
| 6 | Kenco Really Rich ™ |
| 7 | NGC Colombian P1 |
| 8 | NGC Central P1 |
| 9 | NGC Robusta P1 |
| 10 | NGC Brazil P1 |

Samples were prepared with 10 g of coffee dissolved in 40 g of water at 85° C. Full dissolution was achieved with 2 minutes stirring with a 25 mm stirring bar at 150 rpm.

These samples were tested with simple shear sweeps between shear rates of 0.01-1000 $s^{-1}$ using a Discovery HR-2 Rheometer, sample volume 8 ml, with the circulation bath set to minus 4° C. The samples were studied at temperatures of 20 and 65° C. and at concentrations of 1.5 and 20 wt %.

The data has then been fitted to the Quemada model which develops insights into fluid rheology based on the theory of internal structural units (SUs) suspensions. Within concentrated systems the single particles and small flocs may form increasingly larger groups the size of which will be dependent on the shear rates applied.

Therefore since viscosity (η) is a function of structure (η=f(s)). And the structure is dependent on the levels of shear applied (as increased shear rates will merely act to disperse the macro and meso-structures of the flocs into the individual sub-units), the viscosity can be expressed in terms of the packing fraction/compactness since the more compact the SU's the higher the packing and therefore the more structure (viscosity) there will be.

This is because the compactness of the SU's will contribute to the level of structure;

$$\eta_\infty = \eta_F\left(1 - \frac{\phi}{\phi_\infty}\right)^{-2}$$

$$\eta_0 = \eta_F\left(1 - \frac{\phi}{\phi_0}\right)^{-2}$$

Where η is viscosity and ϕ is the measure of compactness.

It was noted that at 20 wt % (i.e. concentrated samples) at 65° C. (close to temperature of consumption) that samples 4 (Millicano™) and 7-10 have significantly higher no. This means that from a microstructural perspective at lower shear rates (1 $s^{-1}$) which are representative of those during mastication and are reflective of mouthfeel, these samples have more structure relative to the other samples. This implies that at these lower shear rates the compactness of their structural units is higher i.e. better packing of the structural units.

Tribology of the samples was also observed. "Tribology is the science and engineering of interacting surfaces in relative motion. It includes the study and application of the principles of friction, lubrication and wear." Therefore the parameter to pay attention to is the $\mu_{max}$ which represents the maximum friction observed for each sample. Since lubrication is indicative of mouthfeel here and a higher $\mu_{max}$ indicates lower rates of lubrication which should translate to lower mouthfeel.

It was observed that at 65° C. (consumption temp) samples 7, 8 and 10 have significantly lower values for $\mu_{max}$ indicating lower friction and hence higher mouthfeel. The exception is sample 9 (*Robusta* blend) with lower oil content.

Measuring the Surface Oil Content of a Soluble Coffee Powder

The sample is extracted by Soxhlet extraction, and the oil content weighed out.

Equipment

- Soxtherm® Gerhardt extraction unit
- Multistat Soxtherm® service unit
- Air oven/circulating oven @ 105° C.±2° C.
- Analytical balance
- Desiccator with silica gel Materials and Consumables

- Gerhardt extraction beaker G_Nr. 13-0050
- Coffee filters (no 4)
- Extraction thimbles, 33×80 mm (S&S 603)
- Cotton wool Reagents

- Hexane 40-60° C. boiling range, AR grade (also known as Hexane)

Sample Analysis.

- Place extraction beaker in the drying oven for 1 hour at 103° C.
- Remove from oven and allow to cool in the desiccator.

Weigh the extraction beaker to 4 decimal places (M1).

Weigh 5-gram dried sample (M2) into a coffee filter paper No 4 and fold it together put the filter in the thimble leaving 5 mm space to place a cotton wool plug on top.

Carefully place a cotton wool plug on top.

Place the extraction thimble into the weighed extraction beaker

Fill the extraction beaker with 150 ml n-hexane.

Place the extraction beaker with content in the Soxtherm® device.

Extract it with the aid of the Multi-Stat Program Base Unit (15 mi extracting boiling, 30 minutes (Total analysis time is 1 hour and 17 min).

After the extraction, move the extraction thimble.

The residual hexane in the extraction beaker gently blown out with compressed air, and further evaporated in the oven for 1 hour at 105° C.

After cooling, weigh extraction beaker with the oil obtained (M3)

EXPRESSION OF RESULTS $$\text{Oil } [\% \ odb] = \frac{\text{Weight of Oil } (M3 - M1)}{\text{Sample weight } (M2)} \times 100$$

Unless otherwise stated, all percentages herein are by weight.

Although preferred embodiments of the invention have been described herein in detail, it will be understood by those skilled in the art that variations may be made thereto without departing from the scope of the invention or of the appended claims.

The invention claimed is:

1. A method of producing a coffee powder, the method comprising:

a) providing an aqueous coffee extract by extraction of roast and ground coffee having a mean particle size of less than 600 microns, the aqueous coffee extract comprising from 30 to 55 wt % soluble coffee solids and from 1 to 10 wt % oil, wherein the aqueous coffee extract consists of water and coffee-derived components;

b) subjecting the aqueous coffee extract to a two stage homogenisation process, wherein the first stage is conducted at 500 to 1000 Bar and the second stage is conducted at 10 to 100 Bar, to provide a homogenised coffee extract;

c) spray-drying the homogenised coffee extract;

wherein the method does not have any step of adding coffee oil to the aqueous coffee extract.

2. The method according to claim 1, wherein the aqueous coffee extract comprises from 1.5 to 5 wt % coffee oil.

3. The method according to claim 1, wherein the aqueous coffee extract is an aromatised coffee extract and is provided by:

(i) providing roast and ground coffee;

(ii) contacting the roast and ground coffee with water to form a coffee composition;

(iii) subjecting the coffee composition to an aroma-separation step to recover a coffee aroma fraction and to form a dearomatised roast and ground coffee, wherein the aroma-separation step recovers from 1 to 15 wt % of the coffee composition as the coffee aroma fraction;

(iv) subjecting the dearomatised roast and ground coffee to one or more aqueous extraction steps to provide an intermediate coffee extract having 35 to 70 wt % coffee solids;

(v) adding the coffee aroma fraction to the intermediate coffee extract to form the aromatised coffee extract.

4. The method according to claim 3, wherein the aromatised coffee extract contains the coffee aroma fraction and the intermediate coffee extract in a weight ratio of coffee aroma fraction to intermediate coffee extract of from 2:5 to 1:20.

5. The method according to claim 3, wherein:

the roast and ground coffee provided in step (i) has a mean particle size of from 100 to 600 microns, step (ii) comprises mixing the roast and ground coffee with water to form a first slurry containing 15 to 30 wt % coffee solids, and wherein the dearomatised roast and ground coffee is a dearomatised slurry.

6. The method according to claim 5, wherein step (iv) comprises:

(A) passing the dearomatised slurry to a first filtration device at a temperature of from 90 to 150° C. to form a first coffee extract and a first filter cake;

(B) adding water to the first filter cake to form a reconstituted slurry having at least 12 wt % coffee solids;

(C) thermally treating the reconstituted slurry at a temperature of from 150 to 205° C.;

(D) then passing the thermally-treated reconstituted slurry to a second filtration device to form a second coffee extract and a second filter cake;

(E) combining the first and second coffee extracts to form a third coffee extract; and (F) concentrating the third coffee extract to form the intermediate coffee extract.

7. The method according to claim 6, wherein the water in step (ii) and/or step (B) is at a temperature of from 80 to 100° C.

8. The method according to claim 6, wherein the reconstituted slurry formed in step (B) has 12 to 30 wt % solids.

9. The method according to claim 6, wherein the second filter cake is subjected to a further high temperature extraction process at a temperature of from 190° C. to 215° C., to obtain a further coffee extract to be combined in step (E) with the first and second coffee extracts to form the third coffee extract.

10. The method according to claim 1, wherein the method further comprises packaging the coffee-extract product.

11. The method according to claim 1, wherein the method is a continuous process.

* * * * *